United States Patent [19]
Schaeppi

[11] Patent Number: 5,975,341
[45] Date of Patent: *Nov. 2, 1999

[54] REUSABLE NON-SPILLABLE BEVERAGE CONTAINER FOR USE WITH VEHICLE BEVERAGE HOLDERS

[76] Inventor: Thomas Schaeppi, 8601 Upland La. North, Maple Grove, Minn. 55311

[ * ] Notice: This patent is subject to a terminal disclaimer.

[21] Appl. No.: 08/763,935

[22] Filed: Dec. 12, 1996

Related U.S. Application Data

[63] Continuation-in-part of application No. 08/107,601, Jan. 26, 1994, Pat. No. 5,590,808, which is a continuation of application No. 08/123,866, Sep. 20, 1993, Pat. No. 5,344,040, which is a continuation of application No. 07/991,993, Dec. 17, 1992, abandoned, which is a continuation-in-part of application No. 07/895,400, Jun. 9, 1992, Pat. No. Des. 343,991, which is a continuation-in-part of application No. 07/822,566, Jan. 16, 1992, Pat. No. Des. 339,029.

[51] Int. Cl.⁶ ................................................ B65D 71/00
[52] U.S. Cl. ...................... 220/737; 220/672; 220/771; 206/217
[58] Field of Search .................................. 220/703, 737, 220/771, 672; 206/217

[56] References Cited

U.S. PATENT DOCUMENTS

| | | |
|---|---|---|
| D. 165,834 | 2/1952 | Gardner . |
| D. 202,643 | 10/1965 | Hoyt, Jr. . |
| D. 215,331 | 9/1969 | Swett . |
| D. 234,997 | 4/1975 | Stampley . |
| D. 263,916 | 4/1982 | Reece . |
| D. 294,100 | 2/1988 | Ross . |
| D. 314,309 | 2/1991 | Thorp . |
| D. 333,067 | 2/1993 | Feltman, III . |
| 604,514 | 5/1898 | Belden . |
| 695,093 | 3/1902 | Crampton . |
| 1,118,794 | 11/1914 | O'Mara . |
| 1,179,856 | 4/1916 | McLeod . |
| 3,090,478 | 5/1963 | Stanley . |
| 3,101,857 | 8/1963 | Freedman . |
| 3,313,447 | 4/1967 | Spencer . |
| 4,193,494 | 3/1980 | Green . |
| 4,582,218 | 4/1986 | Ross . |
| 4,629,153 | 12/1986 | Marcum . |
| 4,676,385 | 6/1987 | Zimmermann . |
| 4,721,216 | 1/1988 | Kinder . |
| 4,791,030 | 12/1988 | DeMars . |
| 4,852,843 | 8/1989 | Chandler . |
| 4,923,086 | 5/1990 | Mahon et al. . |
| 5,029,720 | 7/1991 | Bridges . |
| 5,071,002 | 12/1991 | Bradley . |
| 5,344,040 | 9/1994 | Schaeppi ................................. 220/737 |

FOREIGN PATENT DOCUMENTS

| | | |
|---|---|---|
| 237532 | 12/1964 | Austria . |
| 736912 | 9/1955 | United Kingdom . |

*Primary Examiner*—Joseph M. Moy
*Attorney, Agent, or Firm*—Mackall, Crounse & Moore PLC

[57] ABSTRACT

A reusable beverage container for hot or cold beverages is for use in vehicle beverage holders with receptacles sized for twelve ounce beverage cans. The container has a first lower portion of a diameter approximating or less than the diameters of standard twelve ounce beverage cans. A second upper portion is provided with a diameter larger than lower portion providing additional beverage capacity. A flange is formed between the upper and lower portions. One or more ribs substantially encircle the second upper portion. A handle is positioned sufficiently high on the upper portion so as not to interfere with the insertion of the lower base portion into the vehicle beverage holder.

6 Claims, 3 Drawing Sheets

REUSABLE NON-SPILLABLE BEVERAGE CONTAINER FOR USE WITH VEHICLE BEVERAGE HOLDERS

This application is a continuation-in-part of application Ser. No. 08/107,601, filed Jan. 26, 1994, Pat. No. 5,590,808, which is a continuation of Ser. No. 08/123,866 filed Sep. 20, 1993, Pat. No. 5,344,040, which is a continuation of Ser. No. 07/991,993 filed Dec. 17, 1992, abandoned, which is a continuation-in-part of Ser. No. 07/895,400 filed Jun. 9, 1992, Pat. No. D343,991, which is a continuation-in-part of Ser. No. 07/822,566 filed Jan. 16, 1992, Pat. No. D339,029.

BACKGROUND OF THE INVENTION

Coinciding with the proliferation of fast food restaurants, consumption of beverages in vehicles by drivers and passengers have increased markedly. Several problems are attendant with consumption of beverages while driving. Spillage can occur when the beverage is placed in an unstable location or if the driver fumbles in trying to grasp the container. Additionally, if the beverage container is not readily accessible, the driver may have to take his attention away from the road in order to locate and grasp the container. Where hot beverages are involved the problems are compounded. If the container is not well insulated, the surface may be quite hot to the touch making direct grasping of the surface of the container difficult. When the container has a handle the driver may have to fumble around in attempting to find the handle without taking his eyes off the road. Obviously, any spillage of a hot beverage while driving could result in disastrous consequences.

Within the recent past automobile manufacturers have been designing beverage container holders as standard equipment. The holders typically consist of receptacles with a cylindrical depression and a depth approximately equal to the diameter of the cylindrical depression. Typically, the beverage holders are sized to fit only the standard twelve ounce beverage or soda pop cans with a diameter of approximately 2½ inches. These beverage holders are very effective in securing the twelve ounce beverage cans or other beverage containers with similar diameters.

However, beverage containers, other than the twelve ounce cans, generally do not have similar dimensions as the standard beverage cans and therefore simply do not fit or are very unstable in these holders. This is especially true for the frustoconical shaped containers such as the common disposable fast food beverage containers. Many reusable beverage containers are similarly shaped. If these containers fit at all into the holder it is often a very poor fit with the container only partially in the opening or receptacle of the holder and no contact between the base of the container and the bottom of the receptacle. Such a situation can result in either the container becoming very unstable in the receptacle or the container may becoming lodged in the receptacle causing difficulty in removing the container.

Reusable beverage containers for hot liquids such as coffee cups or mugs are typically of a bowl shape and often larger diameter than the receptacles. Additionally, hot beverage containers typically have handles with a low attachment point usually located at or very close to the bottom of the cup or mug. This attachment point prevents insertion into the receptacle even where the base diameter is compatible with that of the receptacle.

There is a need for a reusable beverage container that provides a secure fit in the vehicle beverage holders that are sized for standard twelve ounce beverage cans. Such a container should have features to allow the driver to quickly and securely grasp and pick up the container, to minimize any fumbling, and spillage, and to minimize any distraction from driving. The container should have a capacity greater than twelve ounces and provide a drinking lip comparable in size to typical coffee cups or mugs.

SUMMARY OF THE INVENTION

A reusable beverage container for hot or cold beverages is for use in vehicle beverage holders with receptacles sized for twelve ounce beverage cans. The container has a first lower portion of a diameter approximating or less than the diameters of standard twelve ounce beverage cans. A second upper portion is provided with a diameter larger than lower portion providing additional beverage capacity. A flange is formed between the upper and lower portions. One or more ribs substantially encircle the second upper portion. A handle is positioned sufficiently high on the upper portion so as not to interfere with the insertion of the lower base portion into the vehicle beverage holder.

A principal object and advantage of the invention is that the beverage container will fit the receptacles in vehicle beverage holders sized for standard sized beverage cans. The lower portion of the container has a secure enough fit to provide stability and a loose enough fit to provide easy insertion and withdrawal. Additionally, the handle does not interfere with insertion into the beverage holder receptacle.

A second principal object and advantage of the invention is that the receptacle for the beverage container and the height of the lower portion of the beverage container are such that the beverage container is held securely in the receptacle without fear of spillage.

Another object and advantage of the invention is that ribs partially encircling the upper portion are provided as an alternative grasping means to the handle. The ribs provide a horizontal support allowing the user to quickly and securely pick up the container without fumbling for the handle. Additionally, the flange between the upper portion and the lower portion provides a similar horizontal support.

The ribs effectively provide a touch identification reference to indicate the orientation of the container. This is an advantage both before the container is picked up and when the user has already grasped the container. After a minimal amount of usage of the beverage container the driver is educated as to the location of the handle and the upper lip with reference to the ribs. Before picking up the container the user may touch the container and by familiarity with the position of the ribs on the container, know that this is a convenient location to grasp the container. The ribs also provide reference as to the location of the handle which is useful before picking up the containers. The breaks in the ribs located at approximately 90° from the handle function in this regard. The ribs also indicate the relative position of the opening while the container is being grasped. The driver, while holding the container, can deduce the location of the drinking lip on the container from the location of the ribs and raise the container to his mouth with confidence, minimizing any need for the driver's eyes to depart from the road.

The ribs and flange are designed with smooth contours providing the advantage of easy cleaning.

The ribs further permit the upper portion of the container to be directly grasped, without utilizing the handle, with hotter liquids than would otherwise be possible. The ribs permit the container to be very lightly grasped in that the container is supported primarily by the ribs rather than simply grasping the outside vertical surface. In that the container is more lightly grasped, there is less contact with the container surface area, and the contact areas are to a greater extent separated from the hot beverage by the additional thickness of the ribs, the heat transfer to the hand is reduced. With less heat transfer, the user perceives less heat, and the container can be held with hotter contents.

Another advantage of the invention is that it provides a drinking lip of a diameter similar to most coffee cups or mugs.

Another advantage of the invention is that it has a higher volume than a can or other container with a similar height and similar base diameter. The volume may be greater than twelve ounces.

DETAILED DESCRIPTION OF THE PREFERRED EMBODIMENTS

Figure 6:
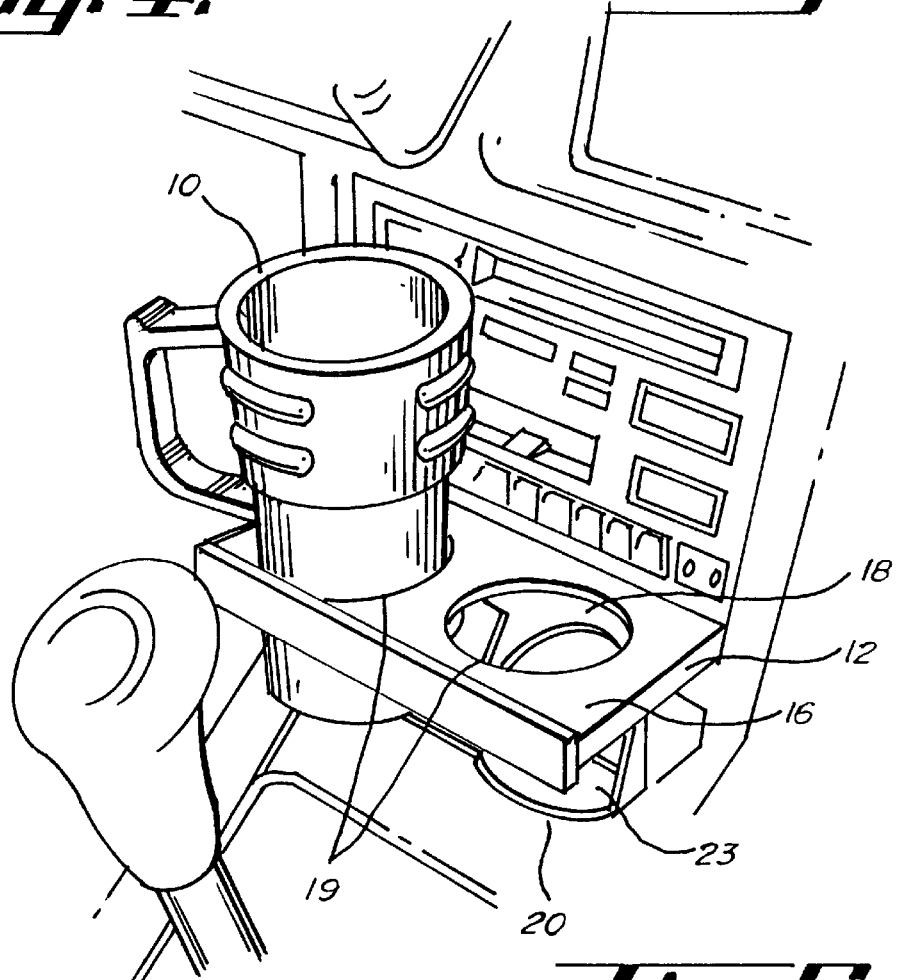
FIG. 6 is a perspective of a vehicle beverage holder extending from a vehicle console, the holder having two receptacles with the invention inserted in one of the receptacles.
Figure 8:
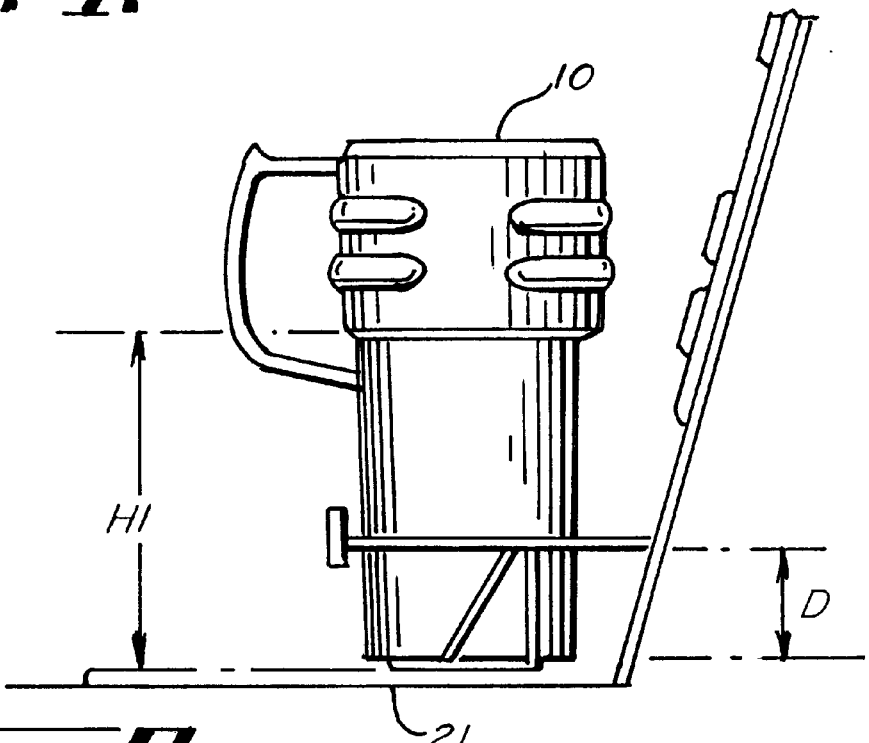
FIG. 8 is an elevational view of a second type of vehicle beverage holder with the invention inserted.

Vehicle beverage holders 12 come in a wide variety of configurations and may be found in various locations in the automobile interior. The holders 12 can be of a fixed nature with no moving parts or can be retractable as in a sliding drawer. Typically they are located in a readily accessible location on the dashboard, in the shift console, or somewhere between the driver and the passenger areas. The vehicle beverage holders usually are designed with one or two receptacles, openings, or recesses 19 for holding beverage containers. A typical configuration is shown in FIG. 6. A large proportion of the vehicle beverage holders have receptacles 19 sized to provide a close fit for standard twelve ounce beverage cans resulting in an aperture diameter slightly greater than 2.50 inches. Typically a receptacle 19 will consist of an aperture 18 in a planar support surface or wall 16 with a base piece 20 located beneath the aperture 18 whereby the aperture 18 provides the lateral support for the container 10 and the base piece 20 supports the weight of the container 10. Alternatively, the beverage container 10 will rest on a portion of the vehicle console 21 below the aperture 18, as shown in FIG. 8.

Preferably, the receptacle 19 has a cylindrical depression 23 with a depth D approximately equal to the diameter of the cylindrical depression, which is of course slightly greater than 2.50 inches as discussed above.

The beverage container 10 of the present invention may be made from any nonporous, rigid, durable material. It can be readily and economically molded from a plastic such as styrene or can be formed from ceramic material. Additionally, materials may be used or incorporated into the container which would provide an insulating effect such as polystyrene.

Figure 1:
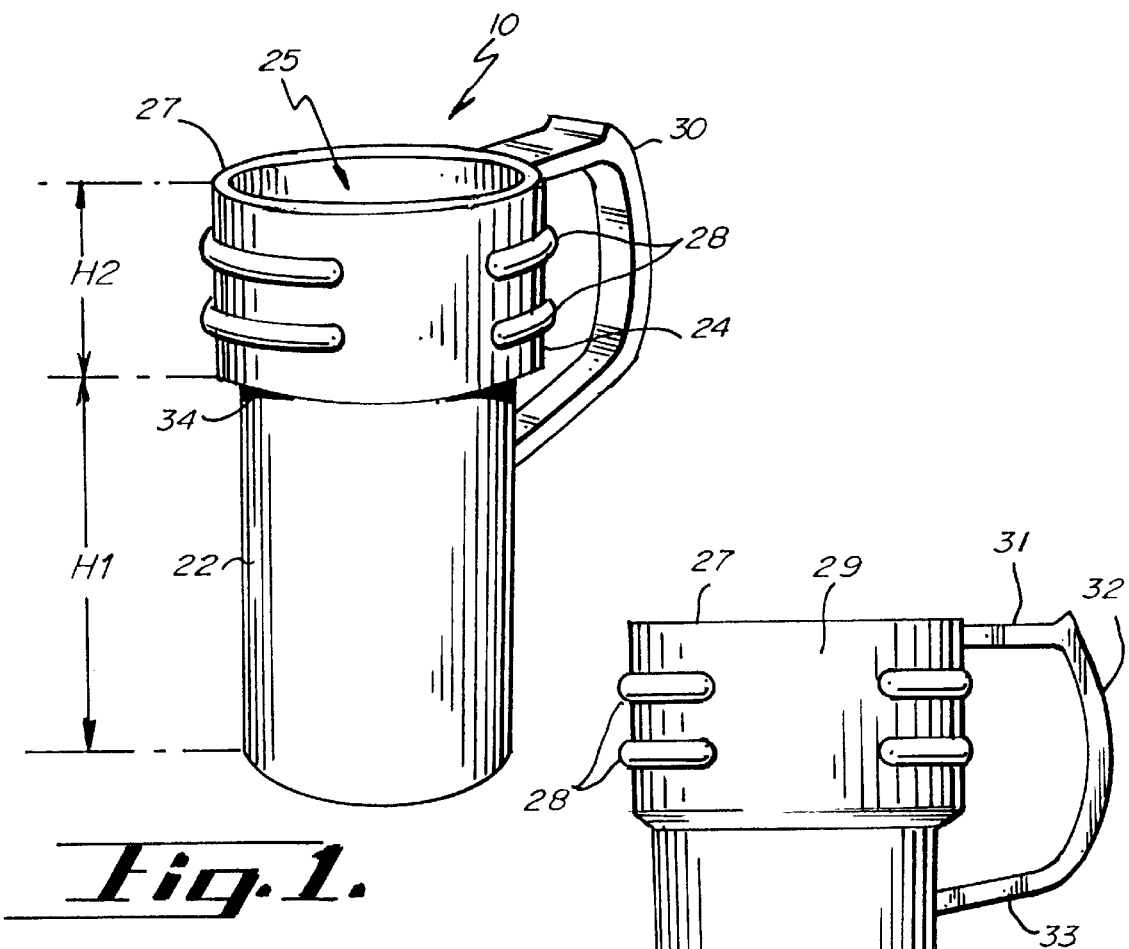
FIG. 1 is a perspective view of a first embodiment of the invention.
Figure 2:
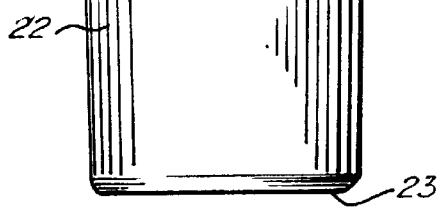
FIG. 2 is an elevational view of the of the first embodiment.
Figure 3:
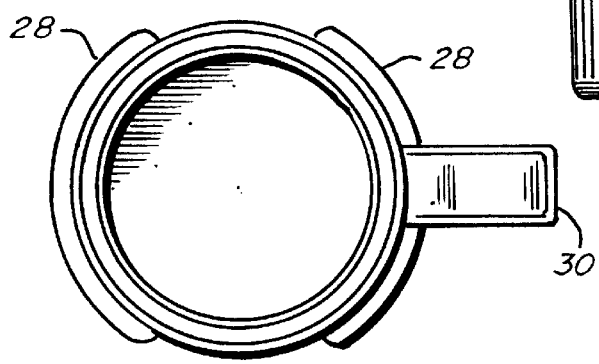
FIG. 3 is a plan view of the first embodiment.

FIG. 1, 2, and 3 show one embodiment of the present invention. As is readily seen in FIGS. 1 and 2, the beverage holding portion of the invention is comprised of the lower base portion 22 and the upper portion 24 both integral with each other. The lower base portion 22 has a closed lower end 23 and is sized to the approximate dimensions of the standard twelve ounce beverage cans, that is 2.50 inches. The upper portion 24 is integral with the lower portion 22 and has a larger inside and outside diameter providing additional capacity. Formed between the upper portion 24 and the lower base portion 22 is a flange 34 extending the circumference of the container. Integral with the upper portion 24 and lower base portion 22 is a handle or grip 30 composed of an upper extension member 31, middle connecting member 32, and a lower extension member 33. The upper extension member 31 is attached to the upper portion 24 proximate the drinking lip 27 and the opening 25. The lower extension member 33 of the handle 30 is attached to the container 10 approximately equidistance between the drinking lip 27 and the closed lower base portion 22. This position provides an adequate gripping length for the handle 30 and avoids any interference when the lower base portion 22 which is inserted into a receptacle 19.

As can be seen in the figures, the lower portion 22 has a first height $H_1$ and the upper portion 24 has a second height $H_2$.

Preferably, $H_1$ and $H_2$ in combination with the diameter of the upper portion 24 and lower portion 24 produce a total capacity greater than twelve ounces.

Figure 7:
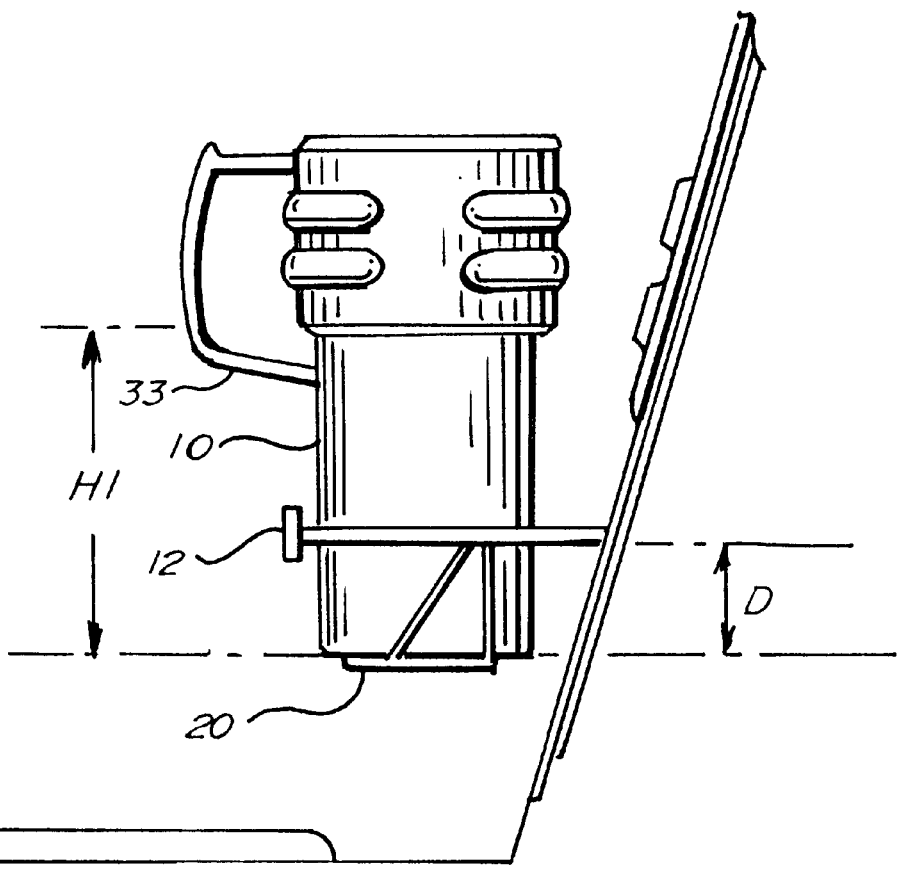
FIG. 7 is an elevational view of a vehicle beverage holder with the invention inserted.

Preferably, as best seen in FIGS. 7 and 8, the first height $H_1$ is such in relation to the depth D of the receptacle 19 that the beverage container 10 is held securely in the aperture 18 and receptacle 19 without fear of spillage. That is, depth D is a substantial fraction of height $H_1$, at least one-third of $H_1$ and more preferably one-half of $H_1$, that the container 10 will not tip over.

On the upper portion, as depicted by FIGS. 1 and 2, are located ribs 28 which extend partially around the upper portion. As can be seen most readily in FIG. 3, the ribs 28 have breaks 29 located 90° from the location of the handle 30 on the container 10.

Figures 4, 5:
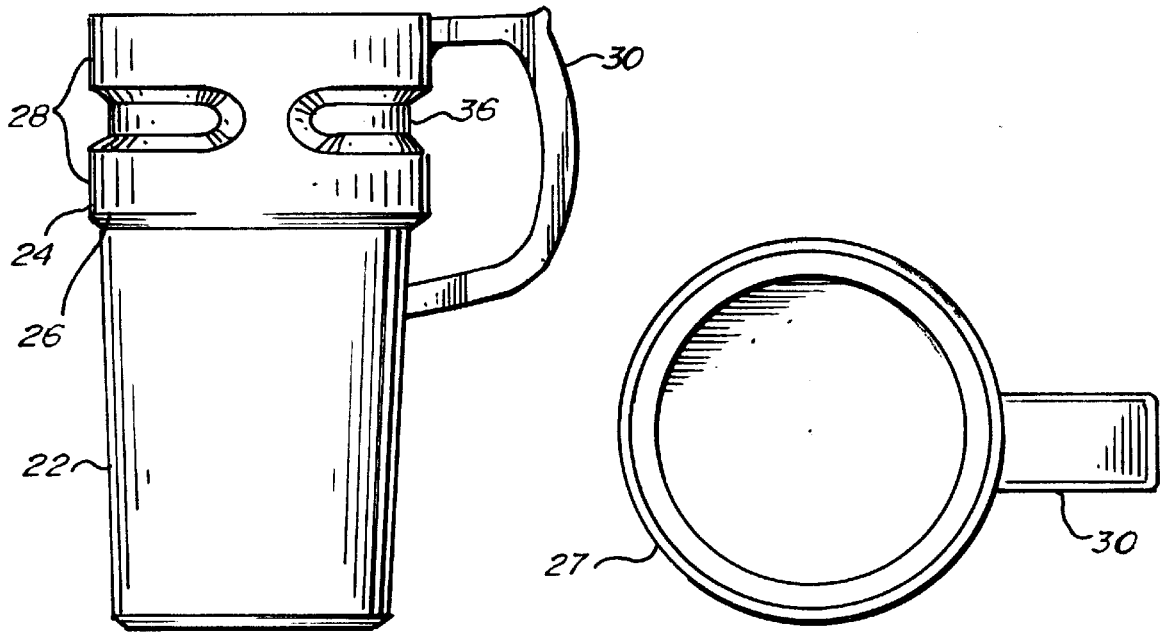
FIG. 4 is an elevation view of a second embodiment of the invention.
FIG. 5 is a plan view of the second embodiment.

FIG. 4 shows an alternative embodiment of the invention with an indentation 36 extending circumferentially around the upper portion 24. The indentation 36 defines ribs 28 above and below the indentation 36. As shown in FIG. 3, there is a break 29 in the indentation 36 located at a position of 90° from the location of the handle 30 on the container 10. The ribs 28 in this embodiment provide the same advantages as in the first embodiment.

FIG. 7 shows the first embodiment of the beverage container 10 inserted in a vehicle beverage holder 12. As can be seen, there is sufficient clearance between the lower member 33 of the handle 30 and the beverage holder 12 to prevent interference with the insertion of the container 10.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A combination tall beverage container and vehicle beverage holder, comprising:

a) a vehicle beverage holder with a substantially planar surface attached to a vehicle at a readily accessible location in the vehicle for a vehicle operator, the planar surface having an aperture sized to receive and support a standard twelve ounce beverage can of approximately two and one-half inches in diameter; and b) a tall beverage container comprising:
   i) a lower base hollow cylindrical portion having a first diameter approximating the diameter of the beverage can, a first height, and a closed lower end defining a substantially open interior and adapted to fit within the aperture of the beverage holder;
   ii) an upper hollow cylindrical portion having a second diameter greater than the first diameter as to not be receivable within the vehicle beverage holder aperture and a second height, the upper portion being coaxial with and integral with the lower base portion, the upper portion having a top opening, wherein the first height and second height combined with the first diameter and second diameter produce a total capacity greater than twelve ounces and the first height is such that the beverage container is held securely in the aperture without fear of spillage.

2. The container of claim 1, wherein the invention further comprises a handle with a lower member, a middle member, and an upper member integral with each other, the upper member rigidly attached to the upper portion.

3. A combination tall beverage container and vehicle beverage holder, comprising:

a) a vehicle beverage holder with a substantially planar surface attached to a vehicle at a readily accessible location in the vehicle for a vehicle operator, the planar surface having a receptacle with a cylindrical depression and a depth approximately equal to the diameter of the cylindrical depression sized to receive and support a standard twelve ounce beverage can of approximately two and one-half inches in diameter; and b) a tall beverage container comprising:
   i) a lower base hollow cylindrical portion having a first diameter approximating the diameter of the beverage can, a first height, and a closed lower end defining a substantially open interior and adapted to fit within the receptacle of the beverage holder;
   ii) an upper hollow cylindrical portion having a second diameter greater than the first diameter as to not be receivable within the vehicle beverage holder receptacle and a second height, the upper portion being coaxial with and integral with the lower base portion, the upper portion having a top opening, wherein the first height and second height combined with the first diameter and second diameter produce a total capacity greater than twelve ounces and the first height is such in relation to the depth of the receptacle that the beverage container is held securely in the receptacle without fear of spillage.

4. The container of claim 3, wherein the invention further comprises a handle with a lower member, a middle member, and an upper member integral with each other, the upper member rigidly attached to the upper portion.

5. A combination tall beverage container and vehicle beverage holder, comprising:

a) a vehicle beverage holder with a substantially planar surface attached to a vehicle at a readily accessible location in the vehicle for a vehicle operator, the planar surface having a receptacle with a cylindrical depression sized to receive and support a standard twelve ounce beverage can of approximately two and one-half inches in diameter; and b) a tall beverage container comprising:
   i) a lower base hollow cylindrical portion having a first diameter approximating the diameter of the beverage can, a first height, and a closed lower end defining a substantially open interior and adapted to fit within the receptacle of the beverage holder;
   ii) an upper hollow cylindrical portion having a second diameter greater than the first diameter as to not be receivable within the vehicle beverage holder receptacle and a second height, the upper portion being coaxial with and integral with the lower base portion, the upper portion having a top opening, wherein the first height and second height combined with the first diameter and second diameter produce a total capacity greater than twelve ounces and the depth of the receptacle is at least one-third of the first height so that the beverage container is held securely in the receptacle without fear of spillage.

6. The container of claim 5, wherein the invention further comprises a handle with a lower member, a middle member, and an upper member integral with each other, the upper member rigidly attached to the upper portion.

* * * * *